INVENTOR.
R. E. WIGHTMAN

BY Hudson & Young
ATTORNEYS

United States Patent Office 2,950,601
Patented Aug. 30, 1960

2,950,601

DETECTION OF WATER OR OTHER MATERIALS IN THE EFFLUENT FROM AN UNDERGROUND STORAGE CAVERN

Robert E. Wightman, Bartlesville, Okla., assignor to Phillips Petroleum Company, a corporation of Delaware Filed Aug. 15, 1955, Ser. No. 528,275

2 Claims. (Cl. 61—.5)

This invention relates to detection of water or other materials in the effluent from an underground storage cavern.

In underground storage systems, materials such as propane or ammonia are stored in underground cavities at periods of light demand and withdrawn from storage during periods of heavy demand. In such installations, a system is provided to separate water from the stored ammonia or propane, and this separation system is seriously overloaded when slugs of water are discharged from storage along with the propane.

In accordance with this invention, a dielectric probe is inserted in the effluent line from the cavern, this probe producing a signal when more than a predetermined amount of water is present in the cavern effluent. This instrument can be connected by an oscillatory circuit to a relay which is energized when the water appears in the effluent, and the output of the oscillator is used to operate an indicator or controller which is effective to interrupt the flow of a displacement medium into the cavern and thus stop the flow of water-contaminated effluent from the cavern until the condition causing the water to appear can be remedied. The invention is also applicable to detecting other materials in the effluent which have a dielectric constant different therefrom.

Accordingly, it is an object of the invention to provide a system for detecting water or other material in the effluent from an underground storage cavern.

It is a further object to provide an improved underground storage system wherein overloading of the water separation facilities is avoided.

Various other objects, advantages and features of the invention will become apparent from the following detailed description taken in conjunction with the accompanying drawings, in which.

Figure 1:
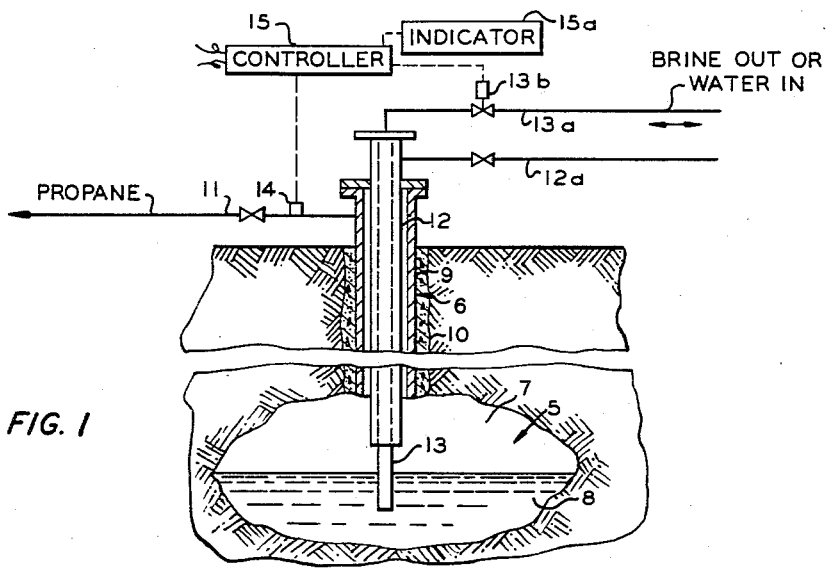
Figure 1 is a view of an underground storage system embodying the detector system of my invention.

Referring now to the drawing in detail, I have shown an underground storage system including a subterranean cavity 5 connected to the surface by a vertical shaft 6. In the example shown, the stored material is liquefied petroleum gas or propane, indicated by reference numeral 7, floating on a layer of displacement medium 8, such as water. As will become apparent hereinafter, the invention is utilized to detect the presence in the withdrawn product of water or other material having a dielectric constant substantially different from that of the propane or other material stored in the cavern.

In the example shown, a metal liner 9 is secured within the shaft by a mass of cement 10, and the propane is withdrawn from storage through a valved line 11 connected interiorly of the liner. Mounted within the liner is a string 12 of casing to which a valved wash line 12a is connected. Within the casing 12 is a tubing 13 having a line 13a with a motor valve 13b therein.

A displacement medium, such as water, is introduced into this line when it is desired to remove stored material from the cavern, and brine or water is removed through this line as stored material is introduced into the cavern.

Figure 3:
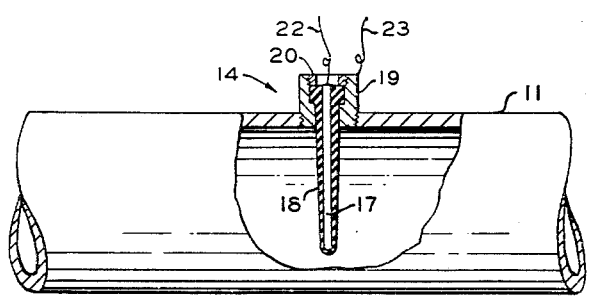
Figure 3 is a view showing the manner in which the probe is connected to the effluent line.

A probe 14 is mounted in the line 11, as indicated by Figure 3, and this probe comprises a central metal rod or electrode 17 which is enclosed in a sleeve 18 of insulating material. The sleeve 18 is retained within a nipple 19 by a plug 20, and the nipple 19 is threaded into the wall of the line 11. A first electrical lead 22 is connected to the rod 17 and a second electrical lead 23 is connected to the nipple 19. The probe thus forms a capacitor wherein the rod 17 and line 11 comprise the two spaced electrodes. The fluid in the line 11 between these elements forms the dielectric. The insulating sleeve 18 is necessary if the fluid being measured is electrically conductive. Otherwise, the sleeve need not protrude into the line.

Figure 2:
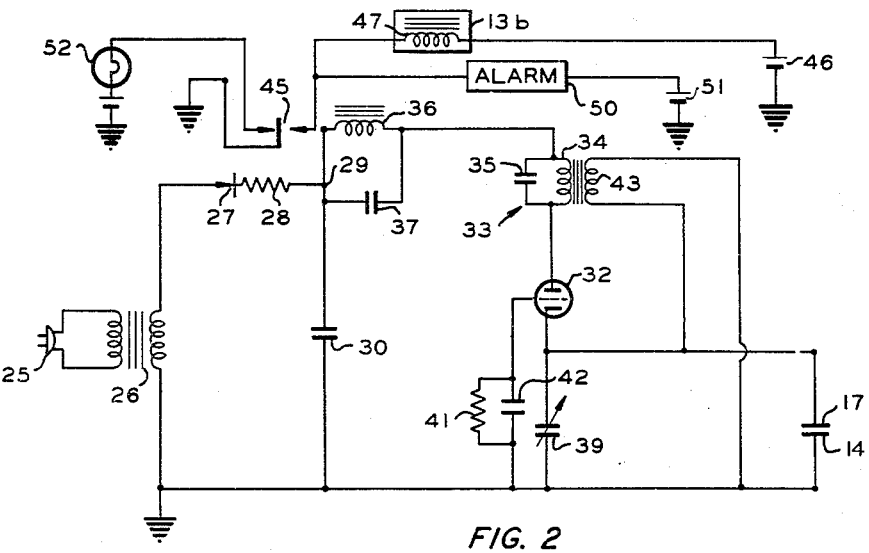
Figure 2 is a schematic circuit diagram of the oscillator.

The probe 14 is connected to a controller 15 which, in turn, is connected to an indicator 15a, and the motor valve 13b. The electrical circuit of the controller 15 is illustrated in detail in Figure 2. The probe 14 is represented as a capacitor wherein the rod 17 forms one electrode and the line 11 forms the second electrode. Electrical energy is supplied to the circuit from a source of alternating current 25 which is connected across the primary winding of a transformer 26. The first terminal of the secondary winding of transformer 26 is connected to the first terminal of a rectifier 27, and the second terminal of the secondary winding is connected to ground. The second terminal of the rectifier 27 is connected through a resistor 28 to a terminal 29. A capacitor 30 is connected between the terminal 29 and ground. The circuit thus far described comprises a conventional power supply wherein a rectified voltage from the unit 27 is filtered by the resistor 28 and capacitor 30. The terminal 29 is thus maintained at a positive potential.

The anode of a triode 32 is connected to the first terminal of a tank circuit 33 which comprises an inductor 34 and a capacitor 35. The second terminal of the tank circuit 33 is connected through the coil of a relay 36 to terminal 29. A capacitor 37 is connected in parallel with the coil of relay 36. The cathode of the triode 32 is connected to ground through a variable capacitor 39. The control grid of triode 32 is connected to ground through a bias resistor 41 which is shunted by a capacitor 42. An inductor 43 is positioned adjacent inductor 34 so as to form a transformer therewith.

One terminal of the inductor 43 is connected to the cathode of triode 32 and to the plate 17 of capacitor 14. The second terminal of the inductor 43 is connected to ground and thus to the line or pipe 11.

The relay 36 closes a switch 45 when energized. The switch 45 is connected in circuit with a voltage source 46 and a coil 47 of the solenoid valve 13b so as to close the valve when switch 45 is closed. The switch 45 also is connected in circuit with an alarm 50 and a current source 51. The relay 45 also has a contact set which energizes a lamp 52 when the relay is deenergized.

The oscillator circuit is biased so that oscillations are intermittent when the dielectric constant of the material between capacitor electrodes 11 and 17 is less than a predetermined value. This occurs, when no water is present in the line 11 so that propane forms the major part of the dielectric between the spaced electrodes of the probe 14. Under this condition, the grid current of triode 32 charges the capacitor 42 to extinguish conduction by the triode. Oscillations are restored when the charge on capacitor 42 leaks off through resistor 41. In one particular embodiment of this circuit, which is described in detail hereinafter, the oscillator was biased so that oscillations occurred approximately 10 percent of the time. Under this condition the average direct current conduction through the triode 32 is not sufficient to energize relay 36 and close switch 45. However, when water or other material having a dielectric constant greater than that of propane is positioned between capacitor electrodes 11 and 17, the capacitance of the probe assembly is increased to decrease the energy transfer in the feedback path from inductor 43 to triode 32. This decrease in feedback energy is sufficient to allow continuous oscillation so that the average value of the direct current conduction through the triode 32 is sufficient to energize relay 36. The capacitor 37 is provided in parallel with the relay to avoid chatter. The switch 45 is closed when relay 36 is energized so that valve 13 is closed to prevent further displacement of the contaminated propane, and resultant overloading of the water separation facilities. The water-containing propane can be advantageously returned to the cavern until the condition causing the presence of the water is remedied.

In one particular embodiment of this invention, the following circuit components were employed: Source 25 supplied energy at 115 volts, 60 cycles per second. Transformer 26 was approximately a one-to-one transformer for purposes of isolation. Resistor 28 had a value of 1000 ohms and capacitor 30 had a value of 10 microfarads. The circuit components of the oscillator were as follows: resistor 41, 500,000 ohms; capacitor 42, 0.01 microfarad; capacitor 35, 10 micro-microfarads, capacitor 37, 10 microfarads; capacitor 39, 1.5 to 7 microfarads. Triode 32 was one-half of a 12AX7 tube. Inductor 34 comprised 35 turns of Number 32 wire. Inductor 43 comprised 18 turns of No. 28 wire. The oscillator had a frequency of approximately 7 megacycles per second. With propane between the capacitor electrodes 17 and 21, the oscillations were intermittent with the triode biased off approximately 90 percent of the time. With propane containing more than 2 percent water the oscillations were continuous.

Thus, in operation, when water is included within the effluent from the cavern, a signal is produced by the oscillator circuit which, through the operation of relay 36, actuates alarm 50 and motor valve 13b to interrupt the flow of water or displacement medium to the cavern when water is detected in the effluent. When no water is present, an indication is effected by light 52.

While the invention has been described in connection with a present preferred embodiment thereof, it is to be understood that this description is illustrative only and is not intended to limit the invention.

I claim:

1. In a system for controlling the flow of effluent from an underground storage cavern wherein a shaft connects said cavern with the surface of the earth, and a line extends from the surface to said shaft to withdraw stored material from said cavern, the improvement which consists in a dielectric probe inserted in a metal portion of said line, said probe including a metal conductor, and a sheath of insulating material surrounding said conductor, a pipe supplying a displacement fluid to said cavern to displace stored material therefrom, a motor valve in said pipe, a lead connected to said metal conductor, a lead connected to said metal portion of said line, and a controller connected to said leads and responsive to the capacitance between said metal portion and said metal conductor to close said motor valve when the probe capacitance rises above a predetermined value.

2. In a system for controlling the flow of effluent from an underground storage cavern wherein a shaft connects said cavern with the surface of the earth, and a line extends from the surface to said shaft to withdraw stored material from said cavern, the improvement which consists in a dielectric probe inserted in a metal portion of said line, said probe including a metal conductor, and a sheath of insulating material surrounding said conductor, a pipe supplying a displacement fluid to said cavern to displace stored material therefrom, a lead connected to said metal conductor, a lead connected to said metal portion of said line, and indicating means connected to said leads to produce an output responsive to the capacitance between said metal portion and said metal conductor.

References Cited in the file of this patent

UNITED STATES PATENTS

| | | |
|---|---|---|
| 1,951,035 | Parker | Mar. 13, 1934 |
| 2,577,612 | Fay | Dec. 4, 1951 |
| 2,633,750 | Langstaff | Apr. 7, 1953 |
| 2,659,209 | Phelps | Nov. 17, 1953 |